Figure 5:
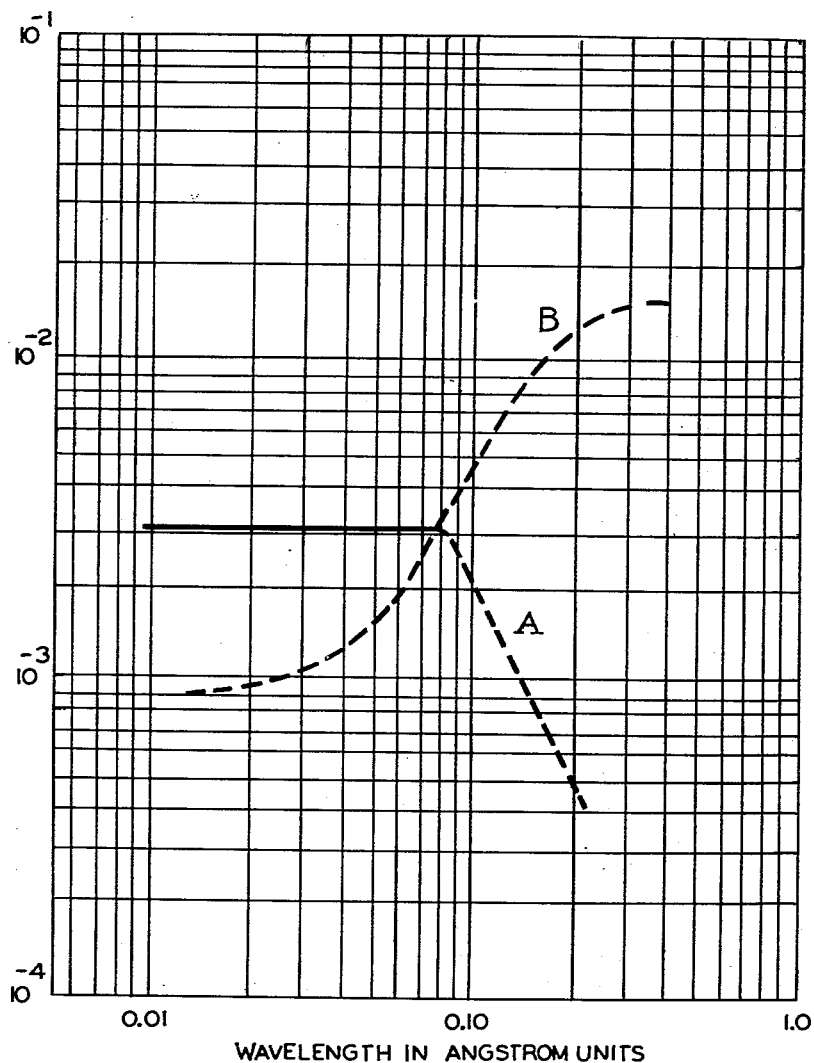

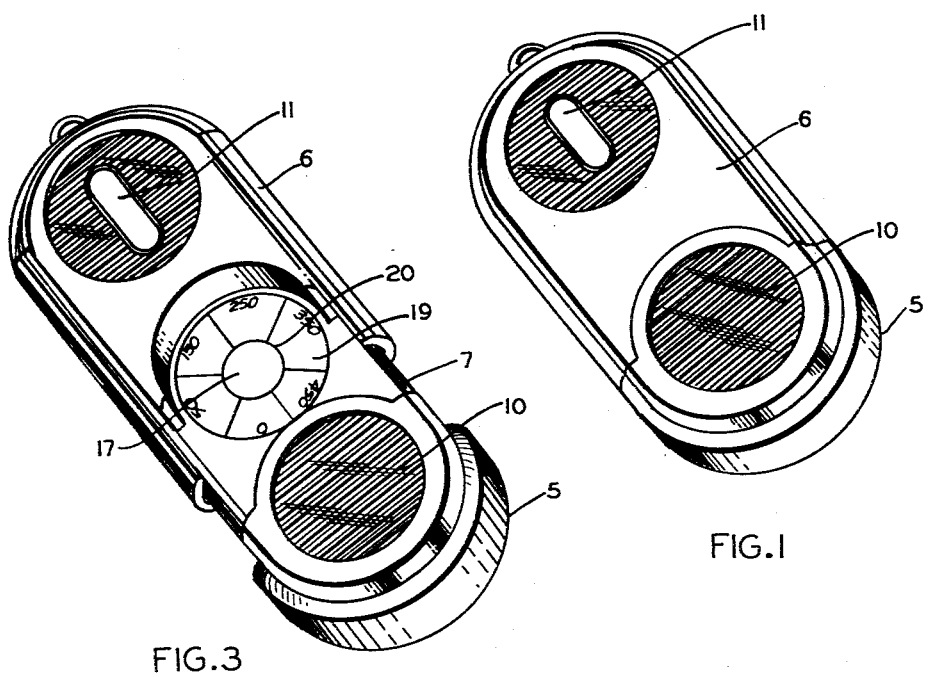

2,994,771
RADIATION DOSIMETRY
Donald P. Jones and Heinz F. Nitka, Binghamton, N.Y., assignors to General Aniline & Film Corporation, New York, N.Y., a corporation of Delaware
Filed Mar. 23, 1959, Ser. No. 801,163
5 Claims. (Cl. 250—83)

This invention relates to radiation indicating and detecting apparatus and particularly to dosimeters of the type which may be worn by a person who is subjected to high energy level ionizing radiations.

The ever increasing use of radioactive isotopes and X-ray generators in medical, industrial and military fields and, consequently, the introduction of nation-wide safety laws for the protection of personnel, demand the availability of simple, yet accurate dosimeters. The principal requirement is an energy and wave length independent response of the dosimeter since the radiation dosage is based on the concept of actual absorbed energy, regardless of the period within which it is absorbed or what energy value the incident radiation has. At present, a dosage of 50 roentgens is considered to be the lower limit of injury likelihood, i.e., a person receiving this disage will, under normal circumstances, completely recover without permanent damage. A dosage of 400 roentgens will cause approx. 50% fatality among those who are exposed to this amount of radiation. Thus, a practical dosimeter for use under conditions where such high dosages can be expected should cover the range between 0 and 400 roentgens. For normal exposure to radiation, e.g., in industrial and medical radiography where personnel are more or less continuously exposed to small amounts of radiation, a safety limit of 0.3 roentgen per week has been adopted. It is assumed that the organism can readily "digest" such a small dosage, even over many years of occupational exposure.

It is a particular object of this invention to provide a radiation dosimeter for emergency exposure to high dosage, viz., for the direct indication of dosages between 0 and 500 roentgens.

Another object of the invention is to provide a photographic dosimeter of sufficient sensitivity and simplicity to require no chemical processing and no accessory apparatus for the evaluation of the dosage.

A particular and salient feature of the invention is that the dosimeter constructed in accordance therewith indicates a dosage of a range of 50–450 roentgens and its indication is independent of the wave length within a predetermined band of high energy ionizing radiation.

Another feature of the invention is that the dosimeter is simple in construction and may be used by anyone without being skilled in the technique of radiology so as to evaluate the exposure by simple inspection of the reactive material.

Other objects and features will be apparent from the following description of the invention, pointed out in particularity in the appended claims, and taken in connection with the accompanying drawings, in which:

FIG. 1 is a perspective view of the dosimeter in a closed position:
FIG. 2 is a sectional view thereof;
FIG. 3 is a perspective view of the dosimeter in an open position;
FIG. 4 is a sectional view of FIG. 3; and
FIG. 5 is a curve indicating the effective response of the radiation of reactive material over a band of wave length between .01 and .1 Angstrom unit.

Compact radiation indicating devices have been used in the past which utilized a light-sensitive photographic film or similar material encased in a light-tight receptacle. The fact that such photographic material had to be processed in order to indicate the exposure proved to be a considerable drawback inasmuch as it is important in many instances to ascertain at once whether or not the radiation dosage is within tolerable amounts.

Other forms of portable dosimeters have also been known which employ materials giving a chemical reaction upon being subjected to radiation. While this type of instrument eliminates cumbersome processing, the indication provided is only qualitative without giving accurate determination of dosage.

The main drawback of prior art devices, however, is the fact that their sensitivity or reactive response to radiation within a certain band of the spectrum is not uniform, particularly in the wave length band which is of interest as to danger to human life. As will be seen from the following description, this deficiency is substantially eliminated.

Referring to the drawings, the dosimeter apparatus consists of an oblong-shaped casing 5, preferably of molded plastic material, opaque to light rays, and is made of two telescoping portions which may be slidably displace with respect to each other.

The portion 6 is U-shaped to provide a sliding fit for the portion 7 which, when fully inserted, forms a smooth, continuous top surface for the casing 5, there being also provided a light lock by the groove 8 in the portion 6 and a tongue 9 on the portion 7 which fits into the groove when the apparatus is closed. The top surface may also be provided with circular depressions 10 and 11 equipped with ridges for easier opening and closing of the casing by the fingers of the hand. A design of oblong configuration with a smooth surface may be applied to one of the depressions such as 11 for the purpose of noting the date of refill of the casing with the sensitized material.

The portion 7 contains a circular intensifying crystal 13 which is surrounded by a light diffusing medium indicated by 13'. This may be either in the form of a coating of magnesium carbonate or a molded cup-shaped piece of the same substance. A ring 12, also of magnesium carbonate, serves as the bottom of the assembly. A lead shield 14, also in the form of a cup, surrounds the diffusing medium and the crystal 13 except at its lower end which faces the bottom of the casing 5. The purpose of the shield 14 and the diffusing medium will be explained later.

The portion 6 supports a circular block 15 which, when the two portions 6 and 7 are closed, is in direct alignment with the shield 14 so as to form a complete enclosure for the intensifying crystal 13. A shallow disc-shaped cut-out 16 of the block 15 serves as a holder for the radiation reacting material 17 which is a relatively high-speed photographic print-out paper. It is disc-shaped to conform to the configuration of the holder.

Print-out papers having a high-speed print-out emulsion suitable for application in the dosimeter herein described are commercially obtainable. Their speed is measured relative to commercial proof paper and is approximately seventy time greater. High-speed print-out emulsions for coating paper or other base are described also in U.S. application S.N. 509,111 filed May 17, 1955, and in Phot. Eng. 1954.

While these print-out emulsions are predominantly sensitive to radiations in the visible spectrum, there is appreciable response to radiation at higher energy levels which tapers off at the shorter wave length ranges. For this reason, it is necessary to use an intensifying element which converts high energy radiation to visual light. The crystal element 13, which is preferably thallium activated potassium iodide, serves the purpose of intensifying the incident high energy radiation by its fluorescence. When the portions 6 and 7 are closed, the print-out material is directly under the intensifying crystal 13 so as to be subjected to the fluorescence thereof.

It has been noted that the fluorescence of such crystals is considerably lower for soft radiations than for hard radiation which, therefore, serves to counteract to a certain extent the inherent slope of energy response of the print-out material 17.

It was mentioned that it is a particular feature of the invention that the dosimeter has a substantially flat response within the particular spectral band of energy where it is to be used. The combination of the fluorescent crystal 13 and radiation reactive material 17 is not sufficient to fully counterbalance their relatively opposing sensitivity characteristics. While the response curve is corrected to a certain extent, there is still an appreciably higher response to soft radiation that to hard X-ray and gamma radiations. In order to further suppress the soft radiation, while retaining the gamma response, a shield 14 is employed which acts as a filter. This shield is preferably made of lead of proper thickness to obtain the required filtration. It was found that a thickness of .09 inch practically equalizes the dosimeter response for radiation energies in the range between .175 mev. monochromatic radiation up to at least 2 mev. This represents a uniform response below 0.08 Angstrom units. For longer wave lengths, the response drops rapidly due to the substantial absorption by the shield 14.

The compensating action of the three-element combination, namely, the radiation reaction material 17 (photographic print-out emulsion), the fluorescent crystal 13, and the shield 14 is shown in FIG. 5. The sensitivity is plotted in reciprocal roentgens over the wave length in Angstrom units. The curve A represents the effective response of the dosimeter and it is seen that within the range starting below .01 and up to .08 Angstrom units, it is essentially flat, falling off sharply as the wave length increases. Curve B indicates the response without the use of the lead shield 14. The cross over point of the two curves is at the end of the wave length band within which the dosimeter response is substantially uniform.

The intensification produced by the crystal element 13 is further enhanced by the light diffusing cup 13'. The use of the light diffusing medium with the incorporated lead shield, results in a speed increase factor of 4.6.

In order to immediately evaluate the exposure to which the dosimeter, i.e., the person carrying it, has been subjected, there is provided a cut-out 18 in the portion 7 of the casing 5, the bottom of which supports a comparison wedge 19 having an aperture 20. The wedge 19 is divided into six equal sectors, varying density, each of which carries a number indicating the relative exposure directly in roentegns from 0–450. An orange filter 21 is placed over the cut-out 18 so as to shield the print-out material 17 which, when the casing is opened (as seen in FIG. 4), is placed directly under the wedge 18 so as to be inspected through the aperture 20. Each sector is in effect a calibrated density for the density comparison of the print-out material 17 with the surrounding sectors of the wedge 19.

In use, the dosimeter may be carried by a person in a pocket where it will be protected against significant temperature fluctuations. When an exposure to radiation is suspected, the user opens the dosimeter for visual evaluation and compares, through the orange filter 21, the density of the print-out paper in the center aperture 20 with the closest matching density of the sectors of the disc-shaped comparison wedge 19 surrounding the center. The figures affixed to each sector of the comparison wedge 19 indicates the dosage directly in roentgens. Intermediate densities can be roughly estimated. After the dosage received is so estimated, the dosimeter is closed and can be inespected again at any time provided that the dosage received did not exceed approximately 500 roentgens which would yield maixmum calibration. Since, however, 50 roentgens represent approximately the dosage beyond which injury becomes likely, the user is advised to avoid any further exposure to radiation once the density of the print-out paper indicates a level which corresponds to the second sector of the comparison wedge. The dosimeter can be readily reloaded with fresh print-out paper. This reloading must, of course, be done in orange darkroom light from containers which protect the shelf-life of the print-out material.

This application is a continuation—in part—of our co-pending application Serial No. 616,715 filed October 18, 1956.

We claim:

1. An apparatus for detecting the presence of high energy ionizing radiation distributed over a range in wave length between approximately .01 to .1 Angstrom unit of the radiation spectrum and indicating the exposure to such radiation comprising a housing opaque to light rays but permeable to said radiation, a photo-sensitive material therein capable of producing a visually observable reaction when exposed to radiation particularly in the longer wave length portion of said band, fluorescing crystal means normally associated with said material for converting said ionizing radiation particularly in the shorter wave length portion of said band into light rays, light diffusing means associated with said crystal and filter means associated with both said material and said converting means for correcting the combined responses thereof whereby the effective reaction of said material is substantially uniform over said range in wave length and means permitting usual observation of said exposed material in comparison with a standard thereby to determine the extent of exposure to radiation within said wave length band.

2. Apparatus in accordance with claim 3 wherein said material comprises high-speed photographic print-out paper.

3. Apparatus in accordance with claim 1 wherein said fluorescing crystal means comprises thallium activated potassium iodide, and said filter means comprises a lead shield surrounding said crystal and said material having a thickness of approximately 0.09 inch.

4. Apparatus in accordance with claim 1 wherein said fluorescing crystal means comprises thallium activated potassium iodide, and said filter means comprises a lead shield surrounding said crystal and said material having a thickness of approximately 0.09 inch and said light diffusing means comprises a coating of magnesium carbonate on the inner side of said casing.

5. A radiation dosimeter for indicating the exposure to high energy ionizing radiation consisting of a casing divided into two distinct portions slidably fitting into each other and made of a material opaque to light rays but permeable to said radiation, a photographic print-out material and a holder therefor affixed to the first portion of said casing, an intensifying crystal partially encased in a lead shield supported in the second portion of said casing and so arranged as to be in contact with said print-out material when said portions are brought together, said casing being thereby closed, said holder forming a continuity of said shield, a cut-out in said second portion having a base for supporting a comparison wedge, an aperture in said base through which said print-out material may be inspected when brought in alignment with said cut-out upon separation of said portions when said casing is opened.

References Cited in the file of this patent

UNITED STATES PATENTS

| | | |
|---|---|---|
| 2,258,593 | Black | Oct. 14, 1941 |
| 2,664,511 | Moos | Dec. 29, 1953 |
| 2,666,145 | Eversole et al. | Jan. 12, 1954 |
| 2,687,478 | Land | Aug. 24, 1954 |
| 2,730,625 | Shurcliff | Jan. 10, 1956 |
| 2,752,505 | Klick | June 26, 1956 |